US006748324B2

(12) United States Patent
Patwari et al.

(10) Patent No.: US 6,748,324 B2
(45) Date of Patent: Jun. 8, 2004

(54) METHOD FOR DETERMINING LOCATION INFORMATION

(75) Inventors: Neal K. Patwari, Ann Arbor, MI (US); Vernon Anthony Allen, Fort Lauderdale, FL (US); Neiyer S. Correal, Cooper City, FL (US); Matthew R. Perkins, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 189 days.

(21) Appl. No.: 10/040,610

(22) Filed: Jan. 7, 2002

(65) Prior Publication Data

US 2003/0130793 A1 Jul. 10, 2003

(51) Int. Cl.[7] ............................ G01S 1/00; G01C 21/32
(52) U.S. Cl. ...................... 701/300; 701/207; 701/214; 340/988
(58) Field of Search .................. 701/207, 214, 701/216, 221, 213, 300; 340/988, 990; 342/357.02, 457; 375/347; 455/456.1

(56) References Cited

U.S. PATENT DOCUMENTS 6,097,336 A * 8/2000 Stilp .................. 342/357.02
6,529,141 B1 * 3/2003 Hanebeck et al. .......... 340/988

* cited by examiner

*Primary Examiner*—Thomas G. Black
*Assistant Examiner*—Arthur D. Donnelly

(57) ABSTRACT

A method is provided for estimating relative location information for wireless devices. Individual estimates are obtained from two or more alternative means that determining the relative location, such as range information, of first and second wireless devices with respect to each other (710, 720, 910, 920). At least one of these estimates involves an estimate of relative location between one of the first and second devices and a third device. These estimates are combined to provide a new estimate that is statistically more accurate than any one of the individual estimates (740, 940).

21 Claims, 5 Drawing Sheets

METHOD FOR DETERMINING LOCATION INFORMATION

FIELD OF THE INVENTION

This invention pertains to a system for determining the location of wireless devices.

BACKGROUND OF THE INVENTION

A number of systems have been implemented or proposed that provide for the determination of location information using various techniques. The Global Positioning System (GPS) is an example of a known system that employs satellites to transmit location determining information. A GPS receiver uses these satellite transmissions as reference data to determine its position. A disadvantage of GPS is that in some locations, such as urban canyons or within buildings, signals from GPS satellites may be occluded.

For applications that require location determination inside an office building or the like, one approach is to arrange a group of receivers at fixed locations within the building, and to attach a transmitter to an object that is to be located. The fixed receivers are connected to a central computer that determines the location of an object based on signals received from the associated transmitter through one or more of the group of receivers. Unfortunately this type of system requires a substantial amount of installed infrastructure, including the fixed receivers, and wired connections between the receivers and base stations. Moreover, these systems do not provide precise determination of location.

The strength of a received signal can in principle be used to determine the distance between a transmitter and a receiver. Another technique commonly used in determining location information is known as time difference of arrival (TDOA). It is known that these and other techniques used to determine relative location information are subject to inaccuracies caused by various factors, including channel attenuation, interference, and the like. It would be desirable to improve the accuracy of systems for determining location. Therefore, an improved method of determining relative location for wireless devices is needed.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which

DETAILED DESCRIPTION OF THE PREFERRED EMBODIMENTS

Figure 1:
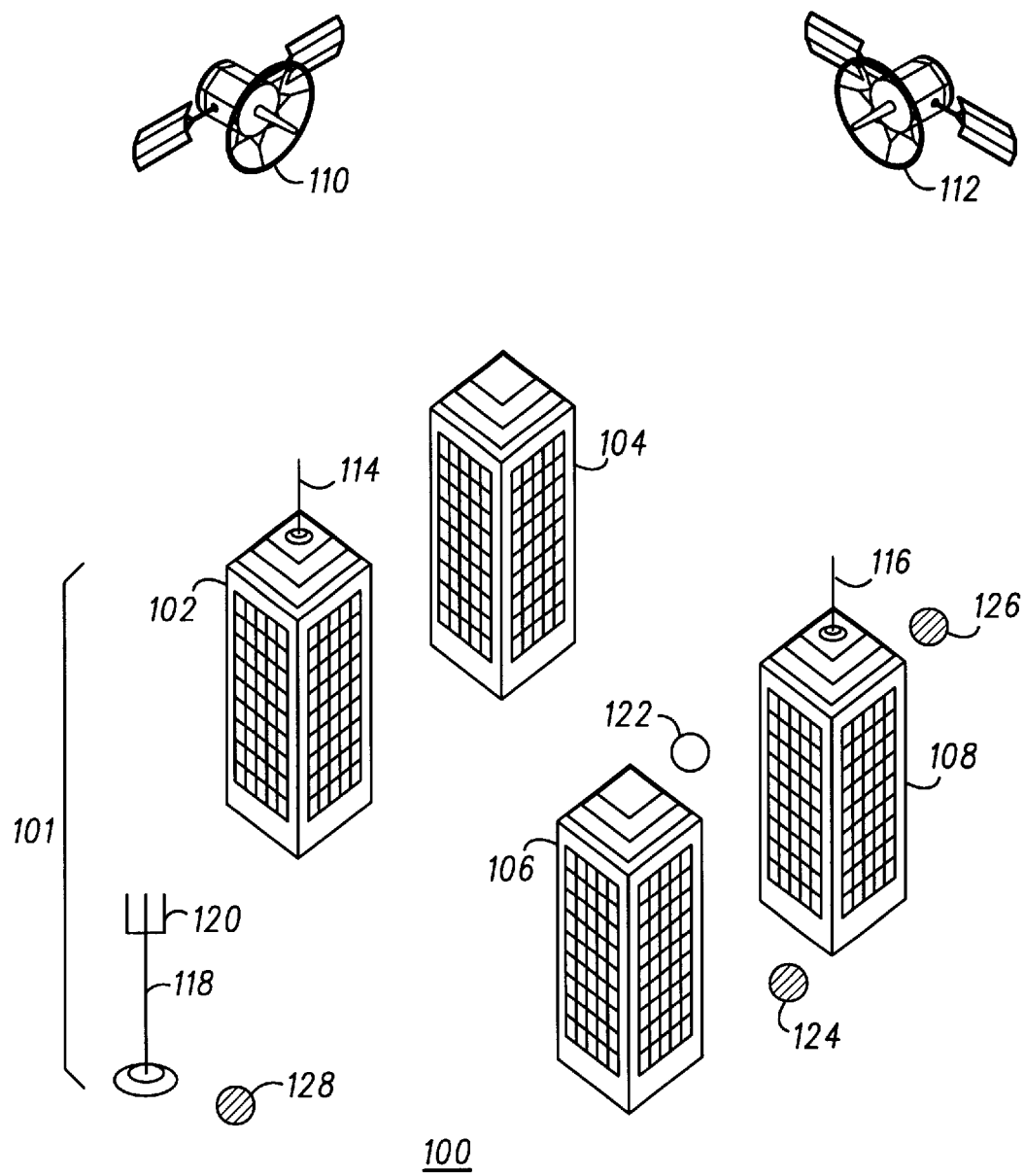
FIG. 1 is an illustration of an urban area serviced by GPS satellites and cellular network towers, and in which is located wireless devices involved in determining each other's location, according to a preferred embodiment of the invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

The present invention provides for a method of estimating relative location information for wireless devices. Individual estimates are obtained from two or more alternative means that determining the relative location, such as range information, of first and second wireless devices with respect to each other. These estimates are combined to provide a new estimate that is statistically more accurate than any one of the individual estimates. For example, consider wireless devices 'A' and 'B' that are spatially separated. According to the invention, a first estimate of relative location with respect to devices 'A' and 'B' is obtained by some means, such as by analysis of transmission signals between devices 'A' and 'B'. A second estimate of relative location between devices 'A' and 'B' is obtained the by utilizing an estimate of relative location between device 'A', and a third wireless device, 'C'. In one embodiment, devices 'B' and 'C' are in close proximity to each other relative to a difference in location between 'A' and either of 'B' and 'C'. By combining the first and second estimates, a new estimate that is statistically more accurate than the first or second estimates can be obtained. In another embodiment, device 'C' is determined to be along a path between devices 'A' and 'B', and the second estimate reflects at least a portion of the path between devices 'C' and 'B'.

FIG. 1 is a schematic illustration of an urban area 100 having wireless devices 122, 124, 126, 128 operating in accordance with the present invention. Although an urban area is shown for contextual purposes, the present invention is not limited to any geographic or situational setting. Global positioning system (GPS) satellites 110, 112 are shown in orbit within view of the urban area 102. The GPS satellites supply reference signals that can be used by a receiver to determine location information. Two base station transceivers 114, 116 are shown located atop two of the buildings respectively. The base station transceivers 114 and 116 can be used to make signal measurements in order to determine the distances to the wireless devices 122–128. A third base station 118 is equipped with a phase-array or 'smart' antenna 120. The smart antenna 120 comprises a plurality of radiating elements as well as processing electronics. Using a direction of arrival (DOA) algorithm, the smart antenna 120 can determine the direction to various wireless devices 122–228 from which it receives signals. Buildings 102, 104, 106, 108, located in the urban area 100 have the potential to block wireless transmission signals, and/or causing multipath interference. Consequently, some wireless devices may not have ready access to a reference source to directly obtain location information.

According to the present invention, one or more of the wireless devices rely on GPS satellites 110, 112 and base station transmitters 114, 116 for reference signals in order to determine present location, while some wireless devices establish relative location information with respect to others. Particularly, the accuracy of such relative location information is increased by combining estimates of relative location using two or more alternative paths.

Figure 2:
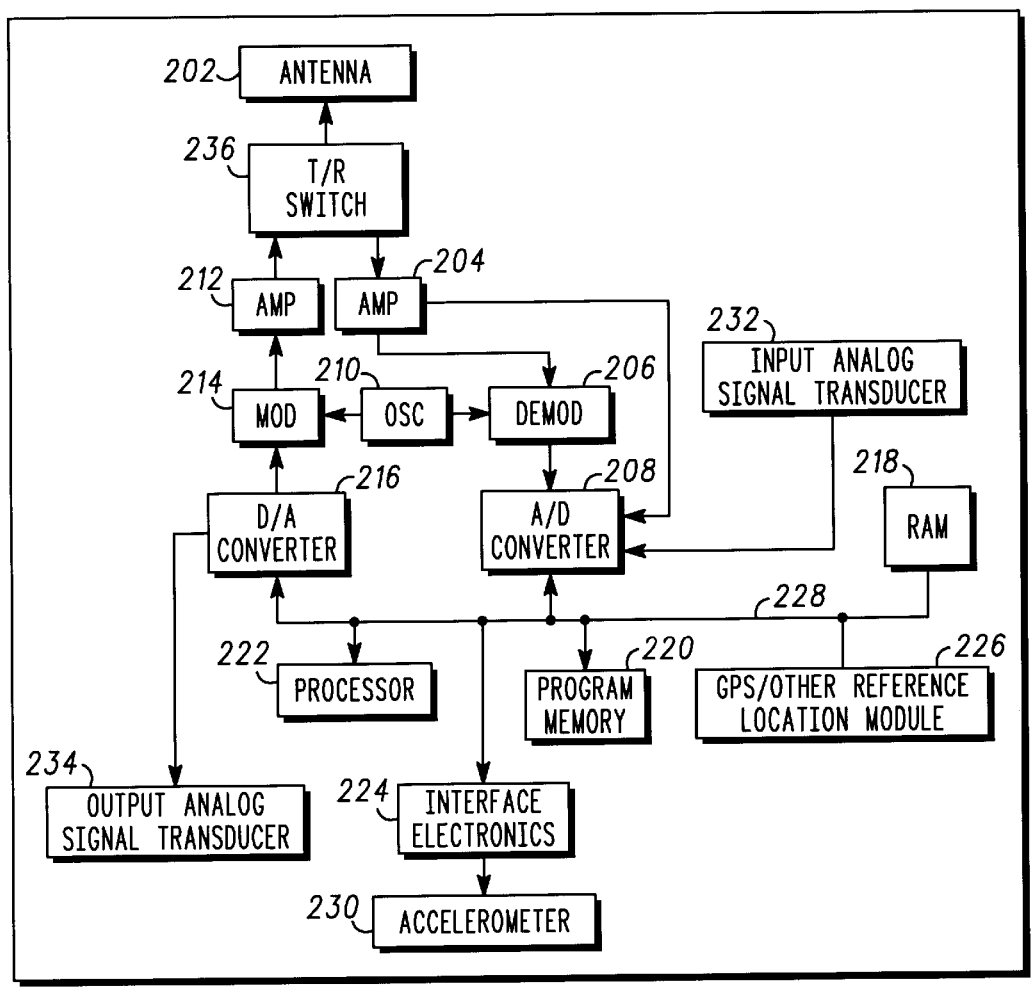
FIG. 2 is a block diagram of a wireless device according to a preferred embodiment of the invention.

FIG. 2 is a schematic of wireless communication device 200 (transceiver) according to a preferred embodiment of the invention. Referring to FIG. 2 an antenna 202 is electrically coupled to a first terminal of a transmitter-receiver switch 236. A second terminal of the transmitter-receiver switch 236 is electrically coupled to an input of a received signal amplifier 204. An output of the received signal amplifier 204 is electrically coupled to a demodulator 206. A local oscillator 202 is also electrically coupled to the demodulator 206. An output of the demodulator 206 is electrically coupled to a first input of an analog-to-digital converter 208. A signal tapped off an amplifier feedback loop in the received signal amplifier 204 is electrically coupled to a second input of the analog-to-digital converter 208. The signal from the amplifier feedback loop is indicative of the power of a received signal. Such a measurement is termed a received signal strength indicator (RSSI). In order to make RSSI a useful indicator of distance, a signal is transmitted at a predetermined power. The antenna 202, T/R switch 236, received signal amplifier 204, and demodulator 206 make up a receiver.

An output of a digital-to-analog converter 216 is electrically coupled to a modulator 214. The local oscillator 210 is also coupled to the modulator 214. An output of the modulator 214 is electrically coupled to an input of a transmitted signal amplifier 212. An output of the transmitted signal amplifier 212 is electrically coupled to a third terminal of the transmitter-receiver switch 236. The modulator 214, transmitted signal amplifier 212, T/R switch 236, and antenna 202 make up a transmitter.

An output of the analog-to-digital converter 208, an input of the digital-to-analog converter 216, Random Access Memory (RAM) 218, program memory 220, a processor 222, accelerometer interface electronics 224, and a GPS or other reference location module 226 are electrically coupled to a digital signal bus 228. The program memory 220 can for example take the form of a Electrically Erasable Programmable Read Only Memory (EEPROM). The processor 222 preferably comprises a programmable Digital Signal Processor (DSP). The accelerometer interface electronics are used to interface to an accelerometer 230. The interface electronics 224 can be electrically coupled to an interrupt pin of the processor 222. The interface electronics 224 can be provided so that when the wireless device 200 is moved, the accelerometer outputs a signal which is input to the interface electronics 224 which outputs a signal that causes an interrupt to be applied to the processor 222. A program that is executed in response to the interrupt request is a program involved in determining the location of the wireless device. The program is stored in program memory 220. Although it is preferred to use an accelerometer, to trigger execution of location programs, alternatively, the location programs could be written to periodically determine location.

An input analog signal transducer 232 is electrically coupled to a second input of the analog-to-digital converter 208. The input analog signal transducer 232 could for example take the form of a microphone. An output signal transducer 234 is electrically coupled to a second output of the digital-to-analog converter 216. The output signal transducer 234 could for example take the form of a speaker.

In the case of a wireless device that is used to tag moveable objects in a building for asset control purposes, it is possible to dispense with the input and output analog signal transducers 232 and 234.

Figure 3:
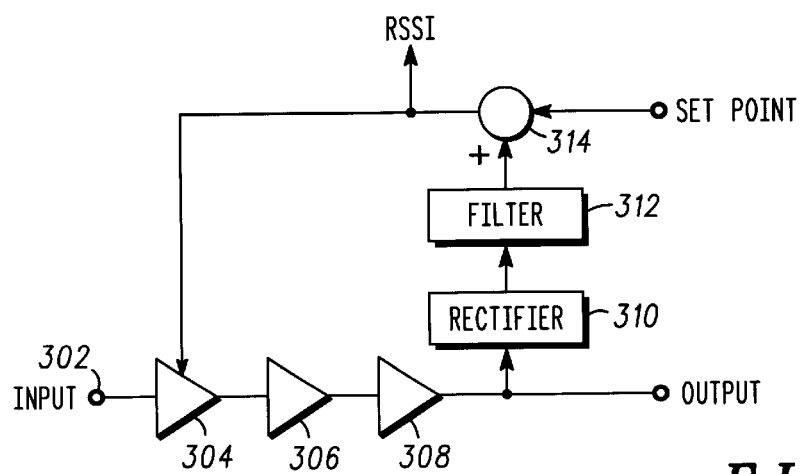
FIG. 3 is a block diagram of a received signal amplifier according to a preferred embodiment of the invention.

FIG. 3 is a block diagram of a received signal amplifier 204 according to a preferred embodiment of the invention. The received signal amplifier 204 comprises an input 302 electrically coupled to a first amplifier 304, a second amplifier 306 electrically coupled to the first amplifier 304, and a third amplifier 308 electrically coupled to the second amplifier 306. An output of the third amplifier 308 is electrically coupled to the demodulator 206, and a rectifier 310. The rectifier 310 is electrically coupled to a low pass filter 312. An output of the low pass filter 312 is electrically coupled to a first input of a differential amplifier. A set point voltage, which corresponds to a power output setting for the received signal amplifier 204, is applied to a second input of the differential amplifier 314. An output of the differential amplifier 314 is electrically coupled to the second input of the analog-to-digital converter 208, and to a gain setting input of the first amplifier 304. The output of the differential amplifier is a RSSI. The received signal amplifier 204, in combination with the analog-to-digital converter 208 constitute a signal strength measurer.

Figure 4:
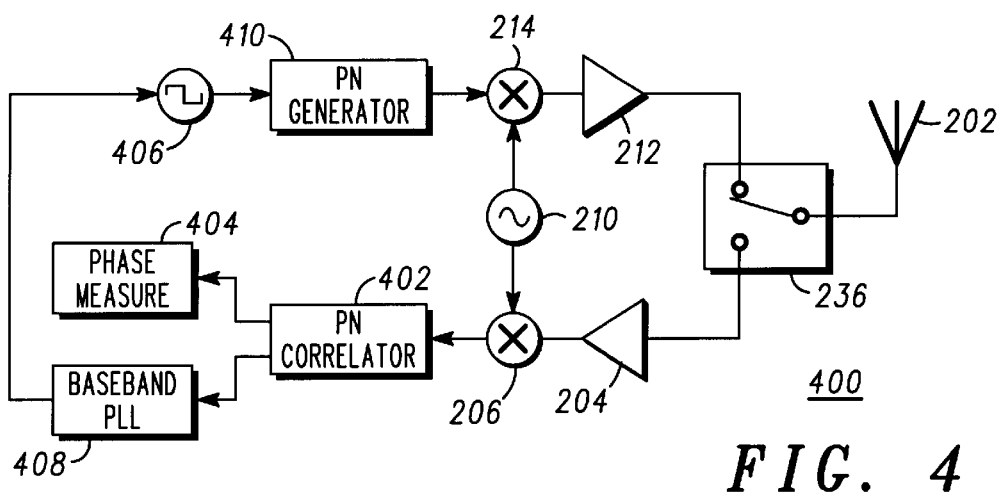
FIG. 4 is a block diagram of a Direct Sequence Spread Spectrum transceiver used to make to way two-way time of arrival distance measurements according to a preferred embodiment of the invention.

FIG. 4 is a functional block diagram of a Direct Sequence Spread Spectrum transceiver 400 used to make to way two-way Time of Arrival distance measurements. Certain hardware elements shown in FIG. 2 are omitted in FIG. 4 because FIG. 4 is intended to highlight a particular function that can be carried out using the hardware shown in FIG. 2. Referring to FIG. 4, the antenna 202, transmitter-receiver switch 212, received signal amplifier 204, transmitted signal amplifier 212, demodulator 206, modulator 214, and local oscillator 210 from FIG. 2 are shown.

The demodulator 206 is electrically coupled to a local oscillator 210, a pseudo random number sequence (PN) correlator 402. A PN generator 410 is also electrically coupled to the correlator 402. The correlator 402 serves to perform a correlation calculation between a version of the PN received from the demodulator 206 and a version of the PN input by generator 410. The correlator 402 inter-operates with a phase measurer 404 that determines a relative phase shift between the two versions of the PN that gives a maximum correlation calculation result. An output of the correlator 402 is electrically coupled to an input of a base band phase locked loop 408. The base band phase locked loop 408 is electrically coupled to a clock 406. The clock 406 is electrically coupled to the PN generator 410. The PN generator is electrically coupled to the modulator 214.

The correlator 402, phase measurer 404, base band phased lock loop 408, and PN generator 410 can be implemented as one or more programs stored in program memory 220, and executed by processor 222.

The same transceiver 400 can be used by two or more devices that are involved in a two-way time of arrival (TOA) distance measurement. One device is an initiator, and another device is a responder. In operation, an initiator first generates and transmits a PN. A responder receives the PN and using phase locked loop 408 adjusts the rate clock 406 by which it measures time, and that is used to drive the PN generator 410, to match a chip rate of the received base band signal. After waiting a period of time the responder retransmits the PN. The period of time that the responder waits is preferably determined by the following expression:

$$T = R * BT,$$

where BT is the duration of the pseudo random number sequence, and

R is a random integer.

The duration of the pseudo random number sequence multiplied the speed of light is preferably greater than the range of the transceiver, so as to avoid ambiguity in the measured distance. Introducing randomness in the response tends to avoid collisions between multiple responding devices, if they are programmed to respond to the same pseudo random number sequence.

Upon receiving the PN retransmitted by the responder, the initiator, using phase measurer 404 inter-operating with the correlator 402, determines an offset time between the time at which the pseudo random number was first sent by the initiator and the time at which the pseudo random number was received back from the responder. The offset time is multiplied by C to obtain a measurement of the distance separating the initiator and the responder. The correlation operation is a signal measurement in that the phase of the received signal is measured.

Figure 5:
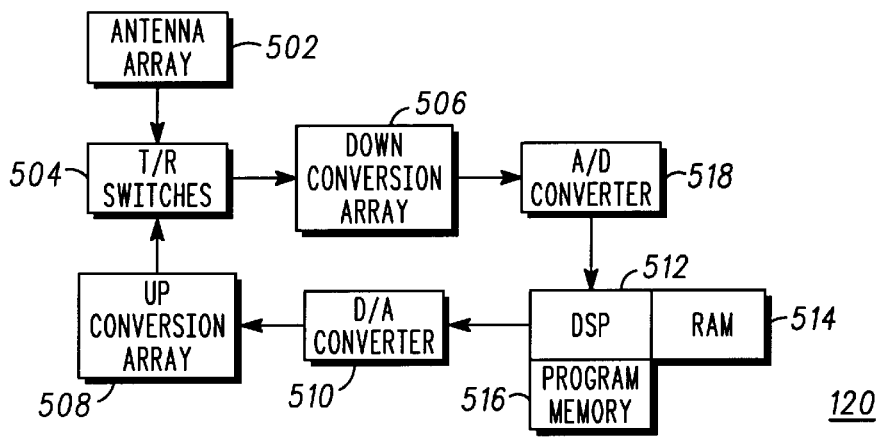
FIG. 5 is a block diagram of a smart antenna according to an alternative embodiment of the invention.

FIG. 5 is a block diagram of the smart antenna 120 according to an alternative embodiment of the invention. Referring to FIG. 5 an antenna array 502 is electrically coupled to a transmitter-receiver switch array 504. The antenna array comprises a phased array, so that signals transmitted from a selected direction can be selected. The transmitter-receiver switch array 504 is electrically coupled to a down conversion array 506, and an up conversion array 508. The down conversion array 506 is electrically coupled to a multi-channel analog-to-digital converter 518. The up conversion array is electrically coupled to a multi-channel digital-to-analog converter 510. A digital signal processor 512 is electrically coupled to the multi-channel analog-to-digital converter and to the multi-channel digital-to-analog converter 510. The digital signal processor 512 is integral with or electrically coupled to random access memory 514, and program memory 516. A Direction of Arrival (DOA) algorithm is stored in program memory 516 and run by the digital signal processor 512. The DOA algorithm processes signals digitized by the multi-channel analog-to-digital converter 518 in order to select signals arriving from particular directions at the antenna array 502. The DOA algorithm determines the direction in which a remote transmitter is located. Signals can also be transmitted in a particular direction by the antenna array 502 by controlling the relative phasing of signals applied to a plurality of antennas in the antenna array 502.

A single DOA measurement for a particular mobile wireless device absent other information would merely determine its direction. However such a measurement can be utilized according to the teaching of the invention to contribute to the location estimates for the particular mobile device and other mobile devices in its vicinity.

Rather than being fixed at base station 120, the smart antenna can be mounted to a first mobile device such as a vehicle mounted wireless device. If the bearing of the first mobile device is not known then the direction to other mobile devices, (e.g. transmitting mobile devices) will not be of great use, however the difference between the directions to two other devices as measured using a smart antenna at a first device will be invariant under rotations of the first mobile device, and can according to the teachings of the invention be used to in estimating the locations of the three devices and others in their vicinity.

Figure 6:
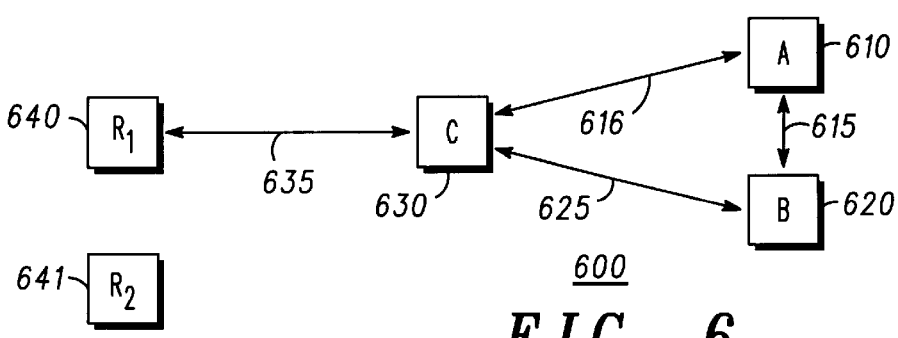
FIG. 6 is a diagram of a first arrangement of spatially distributed transceivers operating in accordance with the present invention.

FIG. 6 shows a system of spatially distributed transceivers 600, referred to herein as nodes, operating in accordance with the present invention. The system 600 may be operated as a loosely coupled network of devices, or with an infrastructure for more central management. The system 600 shown includes reference nodes 640, 641, i.e., nodes with established positions based on reference systems, a node 630 with a known spatial relationship 635 with at least one reference node 640, and nodes 610, 620 of unknown location in the process of establishing location information. For discussion purposes, the two nodes that are of unknown location are labeled as device 'A' 610, and device 'B' 620, and the node a known spatial relationship to a reference node is labeled 'C'. In the preferred embodiment, each of the devices 610, 620, 630 has the capability of determining its location relative to another device within communication range, in a peer-to-peer manner, utilizing algorithms based on time difference of arrival, received signal strength, or other such techniques. However, according to the present invention, under certain circumstances, a device can improve the accuracy of the estimate of relative location information to another by utilizing estimates of relative location to a third device.

Figure 7:
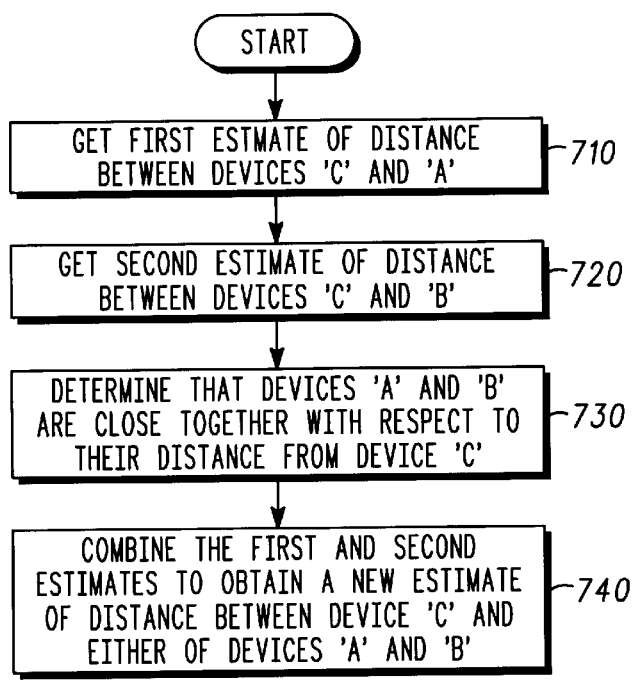
FIG. 7 is a flowchart of procedures showing a first embodiment for improving estimates of relative location information, in accordance with the present invention.

FIG. 7 shows a flowchart of procedures 700 of a first embodiment for improving estimates of relative location information, in accordance with the present invention. Referring to FIGS. 6 and 7, devices 'A' and 'B' have established estimates of relative location, such as range or distance and direction with respect to each other. Device 'C' then establishes communication with device 'A' and obtains a first estimate of relative location with respect to device 'A', step 710. Device 'C' also obtains a second estimate of relative location with respect to device 'B', step 720. Based on information collected from devices 'A' and 'B', device 'C' determines that devices 'A' and 'B' are in close proximity to each other with respect to their location relative to device 'C', step 730. Consequently, devices 'A' and 'B' are assumed to be located together and the estimates of relative location between devices 'C' and 'A' and between devices 'C' and 'B' are combined to obtain a statistically more accurate estimate than each individual estimate alone, step 740. Note that although device 'C' is described as determining or obtaining the estimates, the present invention contemplates that such determination may be made by other devices in a peer-to-peer or other manner. Additionally, the procedures described are not dependent on the order of determination of estimates.

The method of combining the estimates is preferably related to the technique used to obtain the estimates. In one embodiment, the first and second estimates mentioned above are estimates of distance obtained using an algorithm based on received signal strength. In this embodiment, the first estimate and the second estimate are averaged together using a geometric mean function to obtain the new estimate. Particularly, the new estimate, $d_{AB,C}$, is such that $d_{AB,C} = \sqrt{(d_{A,C} \, d_{B,C})}$, where $d_{A,C}$ is the first estimate, and $d_{B,C}$ is the second estimate. In another embodiment, the first and second estimates mentioned above are estimates of distance obtained using an algorithm based on time difference of arrival. In this second embodiment, the first estimate and the second estimate are averaged together using an arithmetic mean function to obtain the new estimate. Particularly, the new estimate, $d_{AB,C}$, is such that $d_{AB,C}=(d_{A,C}+d_{B,C})/2$, where $d_{A,C}$ is the first estimate, and $d_{B,C}$ is the second estimate. The concept is readily extensible to the use of a combination of three or more estimates to generate a new estimate that is statistically more accurate.

Figure 8:
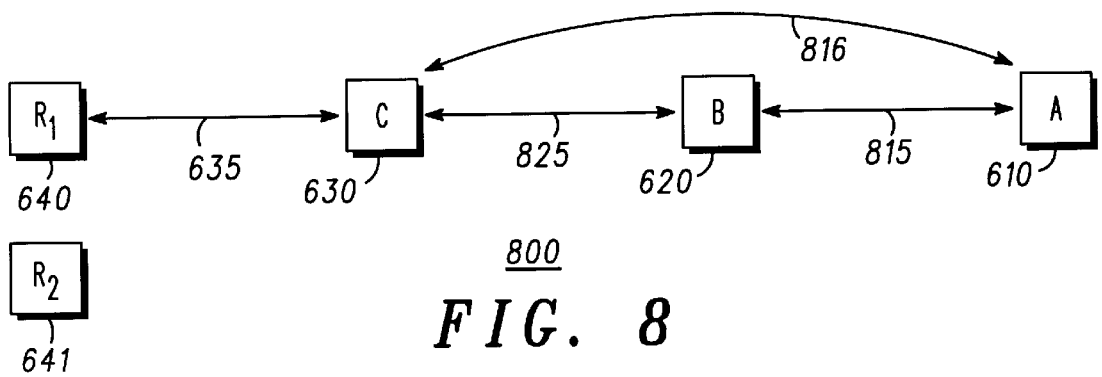
FIG. 8 is a diagram of a second arrangement of spatially distributed transceivers operating in accordance with the present invention.

FIG. 8 shows a second arrangement of the spatially distributed transceivers 800, operating in accordance with the present invention. The devices 630, 640, 641 have communication and performance capabilities as described with respect to FIG. 6. However, at least three of the devices, device 'A' 610, device 'B' 620, and device 'C' 630, are spatially arranged in a different manner. Particularly, these devices 610, 620, 630 are arranged such that device 'B' 620 is interposed between device 'A' 610 and device 'C' 630. According to the present invention, when three or more devices are found to be arranged substantially in series, the accuracy of an estimate of relative location between two devices may be increased by combining such estimate with estimates of relative location between interposing devices. Thus, for example, an estimate of distance 816 between device 'A' 610 and device 'C' 630 can be obtained by combining estimates 815, 825 between devices 'A' and 'B' and between devices 'B' and 'C'. An improved estimate of distance between 'A' and 'C' can be had by combining the estimate 816 obtained directly between devices 'A' and 'C' with the estimates 815, 825 between devices 'A' and 'B' and between devices 'B' and 'C'.

Figure 9:
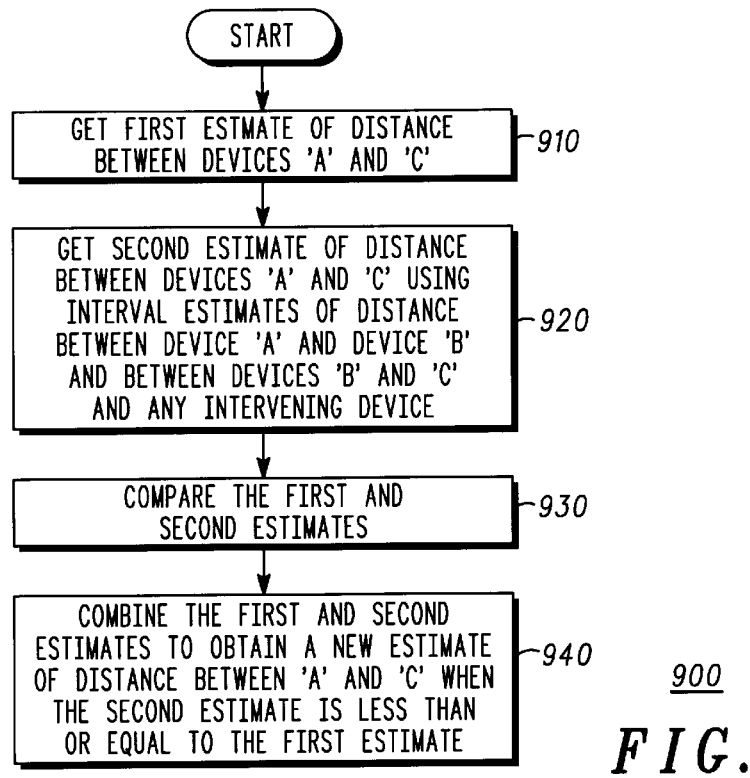
FIG. 9 is a flowchart of procedures showing a second embodiment for improving estimates of relative location information, in accordance with the present invention.

FIG. 9 shows a flowchart of procedures for estimating relative location information corresponding to the arrangement depicted in FIG. 8. Referring to FIGS. 8 and 9, device 'C' establishes communication with device 'A' and obtains a first estimate of relative location or distance with respect to device 'A', step 910. Device 'C' also obtains a second estimate of relative location with respect to device 'A' using interval estimates of distance between devices 'A' and 'B', and between devices 'B and 'C', including any intervening device, step 820. If there were other intervening devices, additional interval estimates may be developed, such as from device 'B' to hypothetical device 'X', and between device 'X' and device 'C'. The first and second estimates are compared, step 930, and if the second estimate is less than or equal to the first estimate, then an assumption is made that the devices 'A', 'B', 'C' 610, 620, 630 are aligned or in series. In such a case, the first and second estimates of distance are combined to obtain a new estimate of distance that is statistically more accurate than the first or second estimate individually, step 940. As stated before, although device 'C' is described as determining or obtaining the estimates, the present invention contemplates that such determination may be made by other devices.

This method of combining the estimates is particularly useful when the estimates of distance are obtained using an algorithm based on received signal strength. Because of certain errors that are prone to occur in this method of estimating distance, when three or more devices are aligned, as is the case depicted in FIG. 8, the distance estimate between 'A' and 'C', $d_{A,C}$, is often greater than the sum $(d_{B,C}+d_{A,B})$, where $d_{B,C}$ is the distance estimate between 'B' and 'C', and $d_{A,B}$ is the distance estimate between 'A' and 'B'. Thus, if $d_{A,C}>=d_{B,C}+d_{A,B}$, then the devices are assumed to be aligned. By utilizing the formula:

$$d_{AB,C}=\sqrt{d_{A,C}^{(1-a)}(d_{A,B}+d_{B,C})^a}$$

where 'a' is a weighting factor, which in the preferred embodiment has been selected to be 0.67. This formula represents a weighted geometric mean of $(d_{B,C}+d_{A,B})$ and $d_{A,C}$. Preferably, more weight is placed on the sum $(d_{B,C}+d_{A,B})$ which has been found in simulations to be more accurate than $d_{A,C}$.

Figure 10:
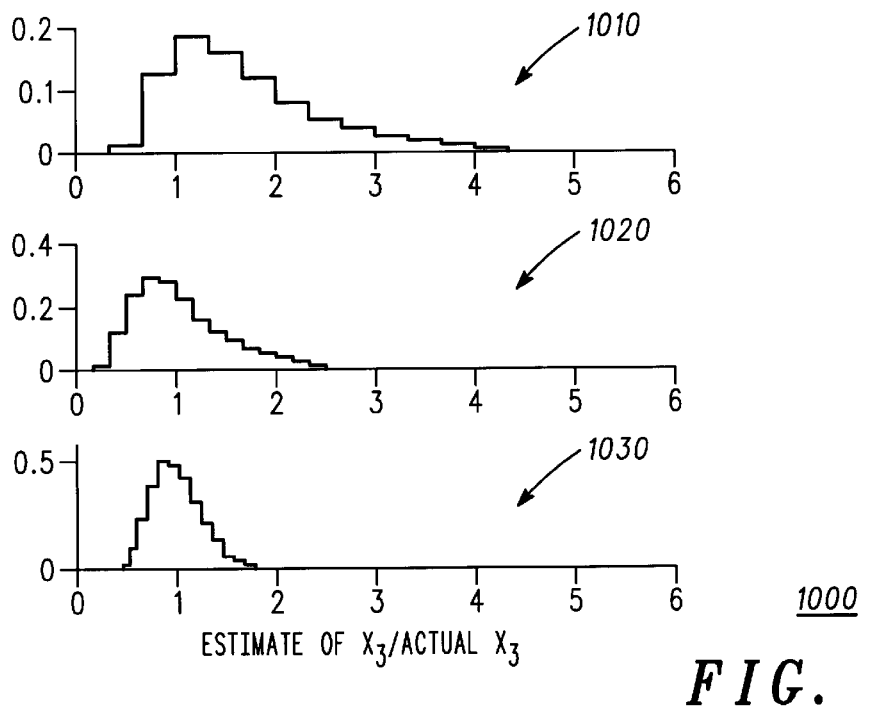
FIG. 10 shows a set of histograms comparing the accuracy distribution of various methods of estimating distance, in accordance with the present invention.

FIG. 10 shows a set of histograms 1000 of simulated results, that compares the accuracy distribution of the various methods of estimating distance. The accuracy is expressed as a ratio of the estimate of the distance using a particular method to the actual distance if accurately measured. The first histogram 1010 shows the accuracy distribution for $d_{A,C}$, i.e., the direct measurement between devices 'A' and 'C' using a received signal strength technique. Note the wide deviation in accuracy. The second histogram 1020 shows the accuracy distribution for the sum $(d_{B,C}+d_{A,B})$, i.e., the direct measurement between devices 'A' and 'B', and between devices 'B' and 'C' using a received signal strength technique. Notice that the deviation in accuracy is significantly improved when compared to the first histogram. The third histogram 1030 shows the accuracy distribution for the weighted geometric mean that combines $d_{A,C}$ with the sum $(d_{B,C}+d_{A,B})$ when $d_{A,C}>$sum $(d_{B,C}+d_{A,B})$. Notice that the deviation in accuracy is substantially improved when compared to the first and second histograms.

The present invention offers significant advantages over the prior art. An estimate of relative location between first and second devices and be improved by combining it estimates of relative location with respect a third device. Systems employing peer-to-peer measurements in location determination could employ the described techniques to improve location accuracy and enjoy substantial benefits.

While the invention has been particularly shown and described with reference to a preferred embodiment, it will be understood by those skilled in the art that various changes in form and detail may be made therein without departing from the spirit and scope of the invention.

We claim:

1. A method of estimating relative location information for first and second wireless devices, comprising the steps of:
    obtaining a first estimate of relative location of the first wireless device with respect to the second wireless device;
    obtaining a second estimate of relative location of the first wireless device with respect to a third wireless device; and
    obtaining a new estimate of relative location of the first wireless device with respect to the second wireless device based on a combination that comprises the first and second estimates.

2. The method of claim 1, wherein the step of obtaining a new estimate comprises the step of combining the first estimate with the second estimate to obtain the new estimate based on a determination that the second wireless device and the third wireless device are in close proximity to each other relative to a difference in location between the first wireless device and either of the second and third wireless devices.

3. The method of claim 2, wherein the step of combining comprises the step of averaging together, using a geometric mean function, values comprising the first estimate and the second estimate to obtain the new estimate.

4. The method of claim 3, wherein the steps of obtaining a first estimate and obtaining a second estimate comprise the step of utilizing an algorithm based on received signal strength.

5. The method of claim 2, wherein the step of combining comprises the step of averaging together, using an arithmetic mean function, values comprising the first estimate and the second estimate to obtain the new estimate.

6. The method of claim 5, wherein the steps of obtaining a first estimate and obtaining a second estimate comprise the step of utilizing a time of arrival algorithm.

7. The method of claim 1, wherein the first estimate represents distance between the first wireless device and the second wireless device, and the second estimate represents distance between the first wireless device and the third wireless device, and further comprising the steps of:
- obtaining a third estimate representing at least a portion of the distance between the second wireless device and the third wireless device;
- computing an alternative estimate for the distance between the first wireless device and the second wireless device using the second and third estimates;
- comparing the first estimate to the alternative estimate;
- when the alternative estimate is less than or equal to the first estimate, determining the new estimate through a combination that comprises the first, second, and third estimates.

8. The method of claim 7, wherein the step of determining the new estimate comprises the step of generating the new estimate, $d_{AB,C}$ such that $d_{AB,C}=\sqrt{(d_{A,C}(d_{A,B}+d_{B,C}))}$, where $d_{A,C}$ is the first estimate, $d_{A,B}$ is the second estimate, and $d_{B,C}$ is the third estimate.

9. A method of determining relative location information of first and second devices with respect to a third device, comprising the steps of:
- obtaining a first estimate of distance between the first device and the third device;
- obtaining a second estimate of distance between the second device and the third device;
- determining that the first and second devices are close to each other with respect to their distance from the third device; and
- upon such determination, combining at least the first estimate and the second estimate to obtain a new estimate of distance to the third device for each of the first and second devices.

10. The method of claim 9, further comprising the step of utilizing an algorithm based on received signal strength to obtain the first and second estimates.

11. The method of claim 10, wherein the step of combining comprises the step of, at each of the first and second devices, averaging together the first estimate and the second estimate using a geometric mean function to obtain the new estimate.

12. The method of claim 11, wherein the step of combining comprises the step of generating the new estimate, $d_{AB,C}=\sqrt{(d_{A,C} d_{B,C})}$, where $d_{A,C}$ is the first estimate, and $d_{B,C}$ is the second estimate.

13. The method of claim 9, further comprising the step of utilizing an algorithm based on time of arrival to obtain the first and second estimates.

14. The method of claim 12, wherein the step of combining comprises the step of, at each of the first and second devices, averaging together the first estimate and the second estimate using an arithmetic mean function to obtain the new estimate.

15. The method of claim 14, wherein the step of combining comprises the step of generating the new estimate, $d_{AB,C}=(d_{A,C}+d_{B,C})/2$, where $d_{A,C}$ is the first estimate, and $d_{B,C}$ is the second estimate.

16. The method of claim 9, further comprising the steps of combining the new estimate with information from a known reference point to obtain specific location information.

17. A method of determining relative location information of a first device with respect to a second device, comprising the steps of:
- obtaining a first estimate of distance between the first device and the second device;
- obtaining a second estimate of distance between the first device and the second device that comprises a first interval estimate of distance between the first device and a third device, and a second interval estimate representing at least a portion of the distance between the third device and the second device;
- combining the first estimate of distance and at least the first and second interval estimates of distance to obtain a new estimate of distance between the first and second devices.

18. The method of claim 17, wherein the step of combining comprises the steps of:
- comparing the first estimate of distance with the second estimate of distance; and
- combining the first estimate of distance with at least the first and second interval estimates of distance only when the second estimate of distance is less than or equal to the first estimate of distance.

19. The method of claim 17, further comprising the step of utilizing an algorithm based on received signal strength to obtain the first and second estimates of distance.

20. The method of claim 19, wherein the step of combining comprises the step of generating the new estimate, $d_{AB,C}=\sqrt{(d_{A,C}(d_{A,B}+d_{B,C}))}$, where $d_{A,C}$ is the first estimate of distance, $d_{A,B}$ is the first interval estimate of distance, and $d_{B,C}$ is the second interval estimate of distance.

21. The method of claim 17, further comprising the steps of combining, by the first device, the new estimate of distance with information from a known reference point to obtain specific location information.

* * * * *